US006623700B1

(12) United States Patent
Horine et al.

(10) Patent No.: US 6,623,700 B1
(45) Date of Patent: Sep. 23, 2003

(54) LEVEL SENSE AND CONTROL SYSTEM FOR BIOFLUID DROP EJECTION DEVICES

(75) Inventors: David A. Horine, Los Altos, CA (US); Babur B. Hadimioglu, Mountain View, CA (US); Richard H. Bruce, Los Altos, CA (US); Jaan Noolandi, Mississauga (CA); Scott A. Elrod, La Honda, CA (US)

(73) Assignee: Xerox Corporation, Stamford, CT (US)

( * ) Notice: Subject to any disclaimer, the term of this patent is extended or adjusted under 35 U.S.C. 154(b) by 246 days.

(21) Appl. No.: 09/721,386

(22) Filed: Nov. 22, 2000

(51) Int. Cl.[7] .............................. B01L 3/02; G05D 9/00; B41J 29/38; B41J 2/015; B41J 21/135; B41J 2/14; B41J 2/16; G01N 1/10

(52) U.S. Cl. ........................ 422/100; 422/104; 422/106; 347/50; 347/54; 347/5; 347/10; 347/20; 347/44; 347/49; 436/180

(58) Field of Search ................................ 422/100, 102, 422/99, 104, 106; 436/180; 347/48, 51, 40, 44, 5, 10, 20, 49, 54

(56) References Cited

U.S. PATENT DOCUMENTS 4,520,374 A * 5/1985 Koto ........................... 138/44
5,023,625 A * 6/1991 Bares et al. .................. 347/48
5,477,249 A * 12/1995 Hotomi ...................... 347/103
5,521,140 A * 5/1996 Matsuda et al. ............ 347/171

(List continued on next page.)

OTHER PUBLICATIONS

Experts in Microdispensing & Precision Printing (MicroFab Technologies, Inc.) http://www.microfab.com—last updated Jun. 12, 2000.

*Primary Examiner*—Jill Warden
*Assistant Examiner*—Brian R Gordon
(74) *Attorney, Agent, or Firm*—Fay, Sharpe, Fagan, Minnich & McKee, LLP

(57) ABSTRACT

A level control mechanism is provided for a biofluid drop ejection device which ejects biofluid drops in small volumes. The biofluid drop device includes a drop ejection mechanism having a transducer which generates energy used to emit the biofluid drops. A reagent cartridge or biofluid holding area holds a biofluid, isolated from the drop ejection mechanism to avoid contamination between the biofluid drop ejection mechanism and the reagent cartridge. The reagent cartridge is connected to the drop ejection mechanism such that upon operation of the mechanism, the biofluid is emitted in controlled biofluid drops. A level sensor is positioned to sense a height of the biofluid within the cartridge. Upon sensing the height of the biofluid below a certain level, an adjustment is made to the height by providing at least one of additional biofluid to the cartridge, and raising the level of the entire reagent cartridge.

22 Claims, 9 Drawing Sheets

U.S. PATENT DOCUMENTS

| | | | | | |
|---|---|---|---|---|---|
| 5,565,113 | A | | 10/1996 | Hadimioglu et al. | |
| 5,618,337 | A | * | 4/1997 | Shinozaki et al. | 106/31.29 |
| 5,631,678 | A | | 5/1997 | Hadimioglu et al. | |
| 5,713,673 | A | * | 2/1998 | Nemoto et al. | 347/43 |
| 5,781,210 | A | * | 7/1998 | Hirano et al. | 106/31.27 |
| 5,798,779 | A | | 8/1998 | Nakayasu et al. | |
| 5,828,391 | A | * | 10/1998 | Shinozaki et al. | 347/171 |
| 5,847,732 | A | * | 12/1998 | Shinozaki et al. | 347/51 |
| 5,877,789 | A | * | 3/1999 | Reinten | 347/10 |
| 5,898,446 | A | * | 4/1999 | Moriyama | 347/46 |
| 5,903,291 | A | * | 5/1999 | Yoshimura et al. | 347/48 |
| 5,943,075 | A | | 8/1999 | Lee et al. | |
| 6,114,122 | A | | 9/2000 | Besemer et al. | |
| 6,221,653 | B1 | * | 4/2001 | Caren et al. | 347/19 |
| 6,242,266 | B1 | | 6/2001 | Schleifer et al. | |
| 6,284,113 | B1 | * | 9/2001 | Bjornson et al. | 204/450 |
| 6,364,459 | B1 | * | 4/2002 | Sharma et al. | 347/38 |
| 6,365,378 | B1 | * | 4/2002 | Hirota et al. | 422/100 |
| 6,384,210 | B1 | | 5/2002 | Blanchard | |
| 6,399,396 | B1 | * | 6/2002 | Bass | 422/100 |
| 6,420,180 | B1 | * | 7/2002 | Bass | 422/100 |
| 6,435,396 | B1 | * | 8/2002 | Eldridge | 222/595 |
| 6,439,694 | B1 | * | 8/2002 | Silverbrook | 347/20 |
| 6,439,695 | B2 | * | 8/2002 | Silverbrook | 347/20 |
| 6,440,725 | B1 | * | 8/2002 | Pourahmadi et al. | 422/100 |
| 6,447,723 | B1 | * | 9/2002 | Schermer et al. | 382/129 |
| 6,450,616 | B1 | * | 9/2002 | Kubota et al. | 347/48 |
| 2001/0043243 | A1 | * | 11/2001 | Tachihara et al. | 347/15 |
| 2002/0008732 | A1 | * | 1/2002 | Moon et al. | 347/48 |
| 2002/0061598 | A1 | * | 5/2002 | Mutz et al. | 436/180 |
| 2002/0063752 | A1 | * | 5/2002 | Clark | 347/48 |
| 2002/0093547 | A1 | * | 7/2002 | Dante et al. | 347/48 |
| 2003/0012892 | A1 | | 1/2003 | Lee et al. | |
| 2003/0048341 | A1 | | 3/2003 | Mutz et al. | |

* cited by examiner

LEVEL SENSE AND CONTROL SYSTEM FOR BIOFLUID DROP EJECTION DEVICES

BACKGROUND OF THE INVENTION

The present invention is directed to sensing and controlling the level of fluids, and more particularly to sensing and controlling the level of biofluid within drop ejection devices.

Various designs have been proposed for the ejection of biofluids which permit the high-speed printing of sequences and arrays of drops of biofluids to be used in various tests and experiments. In the present discussion, a biofluid, also called a reagent, may be any substance used in a chemical reaction to detect, measure, examine or produce other substances, or is the substance which is to be detected, measured, or examined.

Biofluid ejection devices find particular utility in the depositing of drops on to a substrate in the form of a biological assay. For example, in current biological testing for genetic defects and other biochemical aberrations, thousands of the individual biofluids are placed on a glass substrate at different well-defined locations. Thereafter, additional depositing fluids may be deposited on the same locations. This printed biological assay is then scanned with a laser in order to observe changes in an optical property, such as fluorescence.

It is critical in these situations that the drop ejection device not be a source of contamination or permit unintended cross-contamination between different biofluids.

As these biofluids have a high cost, it is desirable to use only small volumes in the testing operations and to ensure the ejected drops are, in addition to being non-contaminated, fully formed. This requirement raises an issue as to proper level control of the biofluid and priming of ejection devices in order to generate a most efficient and useful drop output.

In view of the foregoing, it has been considered desirable to provide mechanism which ensure the proper delivery of biofluids to an ejector device in a timely, useful manner.

SUMMARY OF THE INVENTION

A level control mechanism is provided for a biofluid drop ejection device which ejects biofluid drops in small volumes. The biofluid drop ejection device includes a drop ejection mechanism having a transducer which generates energy used to emit the biofluid drops. A reagent cartridge or biofluid holding area holds a biofluid, isolated from the drop ejection mechanism to avoid contamination between the biofluid drop ejection mechanism and the reagent cartridge. The reagent cartridge is connected to the drop ejection mechanism such that upon operation of the mechanism, the biofluid is emitted in controlled biofluid drops. A level sensor is positioned to sense a height of the biofluid within the cartridge. Upon sensing the height of the biofluid below a certain level, an adjustment is made to the height by providing at least one of additional biofluid to the cartridge, and raising the level of the entire reagent cartridge.

DETAILED DESCRIPTION OF PREFERRED EMBODIMENTS

Figure 1:
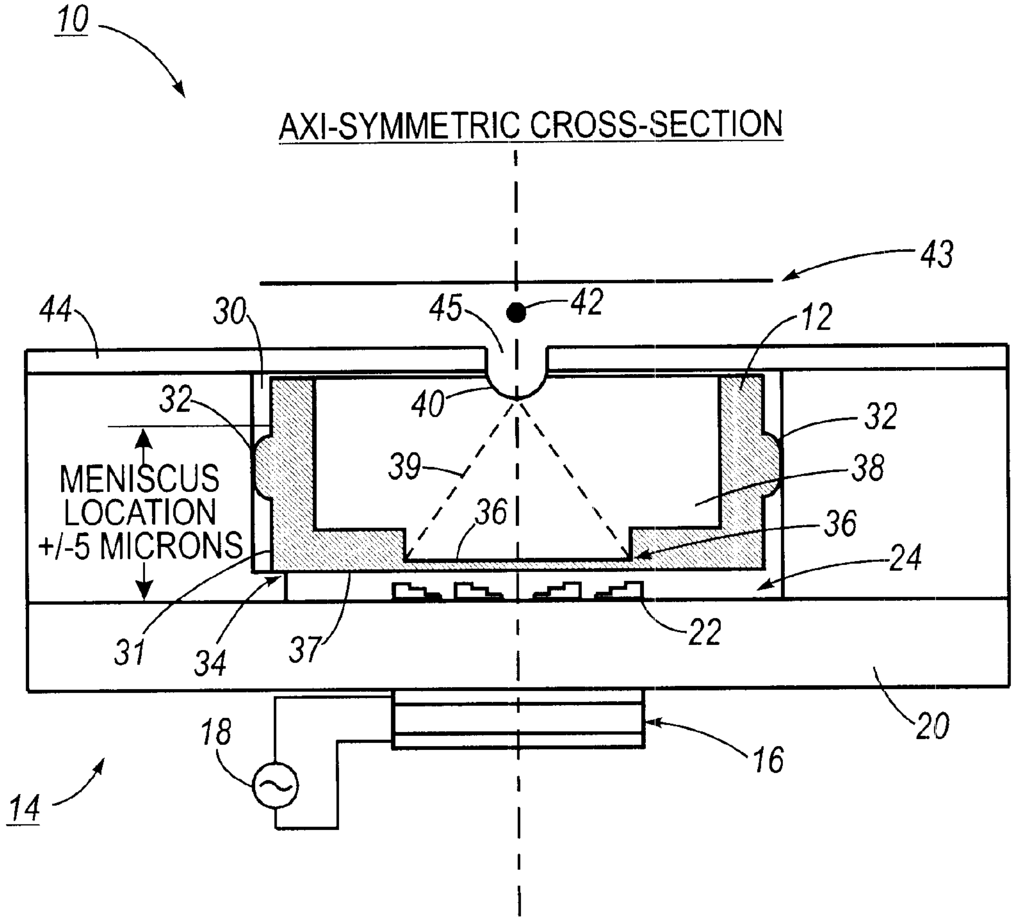
FIG. 1 illustrates an acoustic drop ejection unit with which the present invention may be implemented.

FIG. 1 is a cross-sectional view of an acoustic drop ejection unit 10, having a reagent cartridge 12 inserted within an acoustic drop ejection mechanism 14. A transducer 16 is supplied with energy by a power supply source 18. Transducer 16 is provided on a surface of substrate 20, such as glass. Patterned or located on an opposite surface of glass substrate 20 is a focusing lens configuration 22, such as a Fresnel lens. It is to be appreciated that other types of focusing configurations may also be used in place of Fresnel lens 22.

A connecting layer 24, such as an acoustic coupling fluid is located between Fresnel lens 22 and reagent cartridge 12. The acoustic coupling fluid 24 is selected to have low acoustic attenuation. An example of an acoustic coupling fluid having beneficial acoustic characteristics for this application include water. In an alternative embodiment connecting layer 24 may be provided as a thin layer of grease. The grease connection will be useful when the joining surfaces are relatively flat in order to minimize the possibility of trapped bubbles.

On top of glass substrate 20 are walls 26, 28 which define interior chamber 30 within which reagent cartridge 12 is located. Side wall 31 of cartridge 12 includes a seal 32 extending from its outer surface. Seal 32 secures cartridge 12 within chamber 30 and maintains acoustic coupling fluid 24 below seal 32. A precision depth stop 34 holds cartridge 12 at a desired insertion location. A thin membrane 36 is formed on a lower surface 37 of cartridge 12, positioned substantially above Fresnel lens 22. Membrane 36 is an acoustically thin membrane, wherein acoustically thin is defined in this context to mean that the thickness of the membrane is small enough that it passes over 50% of its incident acoustic energy through to biofluid 38 within cartridge 12.

In operation, energization of transducer 16 emits an acoustic wave which travels through glass substrate 20 to Fresnel lens 22. The lens produces a focused acoustic energy wave 39 that passes through acoustic coupling fluid 24 and membrane 36, reaching an apex at biofluid meniscus surface 40 of biofluid 38. Supplying of the focused energy to surface 40 causes disruptions in the surface resulting in ejection of a biofluid drop 42 from cartridge 12 to substrate 43, such as paper, glass, plastic or other appropriate material. The biofluid ejected can be as small as approximately 15 $\mu$m in diameter. However, this size limitation is based on the physical components used, and it is to be understood that drops ejected by an acoustic drop ejection unit can be made smaller or larger in accordance with design changes to the physical components.

The surface from which biofluid drops 42 are ejected can be either totally open or contained by an aperture plate or lid 44. The lid 44 will have a suitably sized aperture 45, which is larger than the ejected drop size in order to avoid any interference with drop ejection. Aperture 45 must be sized so that the surface tension of meniscus 40 across aperture 45 sufficiently exceeds the gravitational force on biofluid 38. This design will prevent biofluid 38 from falling from regent cartridge 12 when cartridge 12 is turned with aperture 45 facing down. The aperture down configuration has a benefit of maintaining the biofluid 38 clean from material which may fall from substrate 43.

Operation of transducer 16, power supply 18, glass substrate 20, and lens 22 function in a manner similar to previously discussed drop ejection units used in the field of acoustic ink printing. Such operation is well known in the art.

The foregoing design isolates biofluid 38 within reagent cartridge 12, preventing it from coming into contact with drop ejection mechanism 14, or other potential sources of contamination, such as airborne contamination or contamination from biofluids previously used with the ejection mechanism. Reagent cartridge 12 is separated from acoustic coupling fluid 24 by membrane 36. The entire cartridge may be injection molded from a biologically inert material, such as polyethylene or polypropylene. Cartridge 12 is operationally linked to the acoustic drop emitter mechanism 14 by a connection interface which includes membrane 36 and acoustic coupling fluid 24.

In a specific design of the present invention, the width of reagent cartridge 12 may be approximately 300 microns, and membrane 36 may be 3 microns thick. In this particular embodiment, with a design constraint of a focal acoustic wave length being 300 microns and at an operating frequency of known acoustic drop ejection mechanisms, the meniscus location should be maintained within plus or minus five microns from an ideal surface level.

Power supply source 18 is a controllably variable. By altering the output of power supply source 18, energy generated by transducer 16 is adjusted, which in turn may be used to alter the volume of an emitted biofluid drop 42.

As previously discussed, for proper operation of the acoustic drop ejection device 10, the location of the meniscus surface 40 must be maintained within tolerances defined by the device configuration. While in the previously discussed embodiment, due to the specific acoustic drop ejection mechanism being used, that tolerance is +/−5 microns. It is to be appreciated other ranges exist for differently configured devices.

Figure 2A:
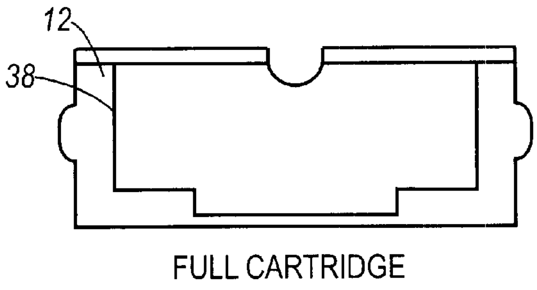
FIGS. 2A and 2B depict fluid levels in a reagent cartridge.
Figure 2B:
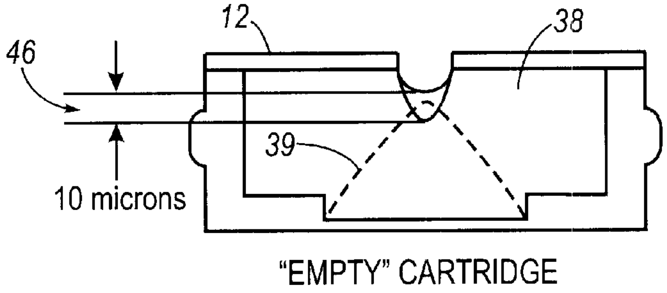

The concept of maintaining biofluid levels of a reagent cartridge 12 within a set level of parameters is illustrated by FIGS. 2A and 2B. For example, FIG. 2A shows reagent cartridge 12 when it is full of biofluid 38. In FIG. 2B the same cartridge 12 is shown in an empty state. It is to be appreciated that empty in this embodiment refers to there being less biofluid 38 than the predetermined parameter height 46, in this instance 10 microns. Thus, there is still biofluid within cartridge 12. However, due to the operational characteristics of acoustic drop ejection unit 10, once biofluid 38 is outside of the predetermined level 46 biofluid drops cannot be reliably ejected. This situation exists since the apex of acoustic wave 39 is not occurring at surface 40 of biofluid 38, and sufficient energy is not transferred to disturb the surface to the degree that a drop will be ejected at this lower level.

Thus, for useful operation of biofluid drop ejection unit 10, it is desirable to provide a configuration which detects the biofluid level while the cartridge 12 is within acoustic drop mechanism 14.

Figure 3:
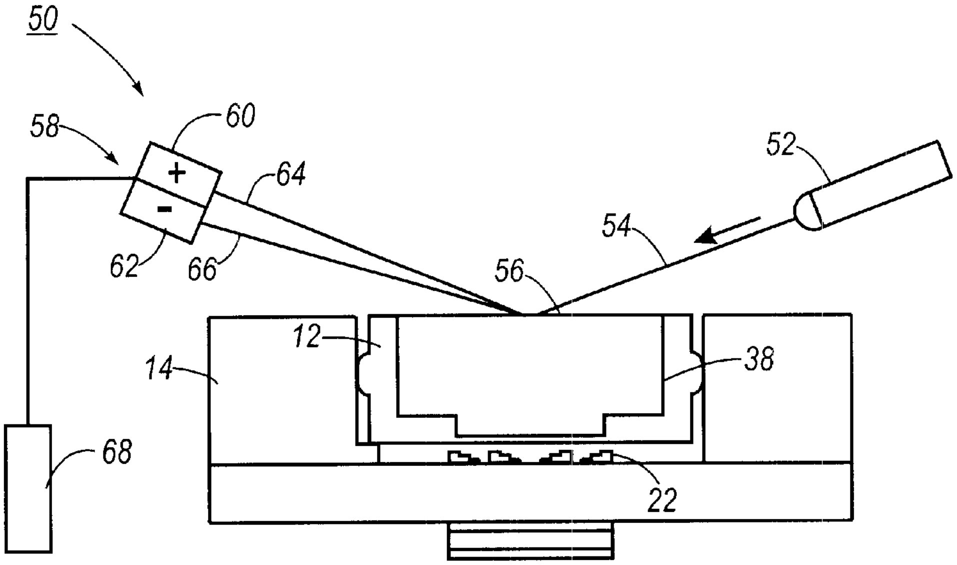
FIG. 3 sets forth a laser biofluid level detection mechanism.

Turning to FIG. 3, illustrated is a first embodiment of a biofluid level detection mechanism 50 which is capable of measuring the level of biofluid 38 within cartridge 12, when cartridge is within ejector mechanism 14.

As biofluid drops are ejected from cartridge 12, the level of biofluid 38 will change. Biofluid level detection mechanism 50 includes a laser 52 positioned such that laser beam 54 emitted therefrom is reflected off of the upper surface 56 of biofluid 38. A laser detection configuration 58 includes a first laser beam detector 60 and a second laser beam detector 62. First laser beam detector 60 is positioned at an angle relative to the acoustic drop ejection unit 10 such that when cartridge 12 has biofluid within the predetermined parameters, the angle of reflected laser beam 64 will impinge upon sensor 60. Laser beam detector 62 is positioned at an angle relative to acoustic drop ejection unit 10 such that it will sense reflected laser beam 66 which is at an angle corresponding to the biofluid 38 being out of the acceptable range for proper operation.

The outputs of sensor detector 60 and sensor detector 62 are provided to a controller 68. This information, along with preprogrammed information as to location of the laser 52 and detectors 60, 62, is used to calculate the biofluid level. The information obtained by controller 68 may then be used in further control of the biofluid level, as will be discussed in greater detail below.

Figure 4A:
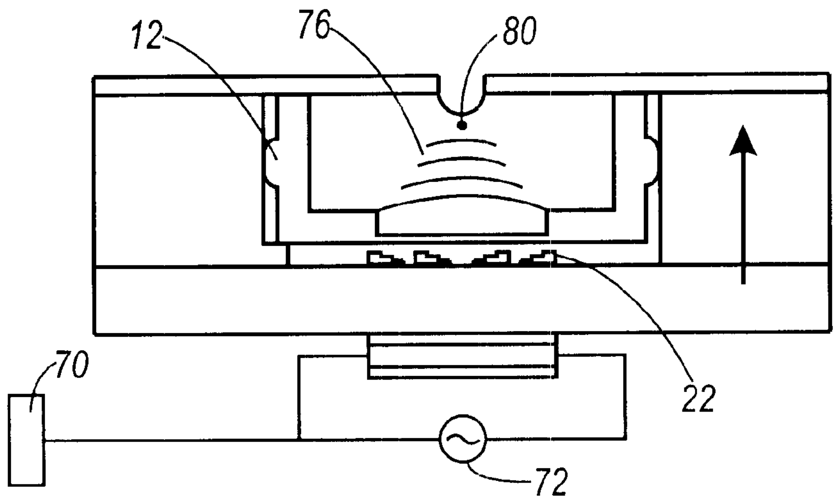
FIGS. 4A and 4B depict an acoustic beam biofluid level detector configuration.
Figure 4B:
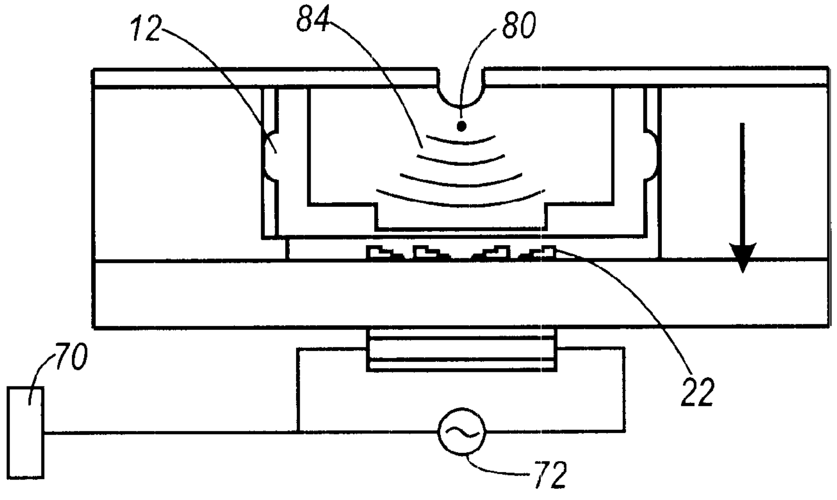

Turning to FIGS. 4A and 4B, set forth is a second embodiment for level sensing in accordance with the present invention. Particularly, controller 70 controls the output of power supply 72 to initiate a short pulse acoustic wave 76 to be transmitted from Fresnel lens 78 to the upper surface 80 of biofluid 38. Controller 70 controls the output from power supply 72 such that short pulse acoustic wave 76 is not sufficient to cause the emission or ejection of a biofluid drop. Rather, short pulse acoustic wave 76 is emitted, and sensed by lens 22. This outbound acoustic wave 76, as shown in FIG. 4A reaches surface 80 and is then reflected back 84 towards lens 22, generating an rf signal provided to controller 70 with an indication of the emission and return of acoustic wave 76.

The time taken for acoustic wave 76 to travel to surface 80 and back to lens 22 is used to determine whether the biofluid is at an appropriate level. This information will be used to adjust the fluid level, as will be discussed in further detail below. In an alternative embodiment, it is possible to vary the supplied frequency to shift the focus, in order to maintain the acoustic wave at the meniscus surface.

Controller 70 is designed to determine the time from emission of the outbound acoustic wave 76 until receipt of the reflected wave 84 having been preprogrammed with parameters as to the speed of the acoustic wave, the depth of the biofluid in cartridge 12 when full, the viscosity of the biofluid as well as other required parameters. Using this information controller 70 calculates the biofluid level within cartridge 12. This information is then used in later level control designs which will be discussed in greater detail below.

In an alternative embodiment controller 70 may be designed to sense an amplitude of the returned wave. The sensed amplitude is correlated to the biofluid level. Particularly, the returned signal of acoustic wave 76 will carry with it amplitude information. If the fluid height is not at an appropriate level, either too high or too low, the amplitude will be lower than expected. The returned amplitude will be at a peak when the fluid is at a correct level for ejector operation. Therefore, to determine the proper level the volume of biofluid is altered and a measurement is made to determine if the returned amplitude is closer or further from maximum amplitude. Dependent upon whether fluid was added or removed and the reaction of the amplitude, it can be determined whether more or less biofluid is needed.

Figure 5:
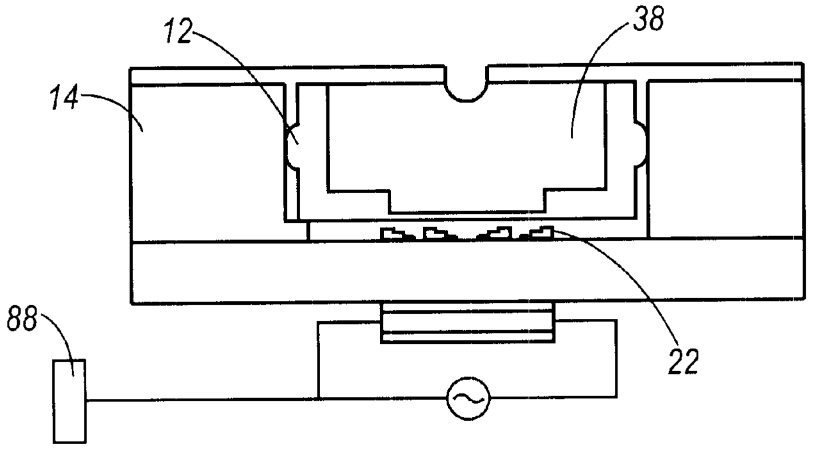
FIG. 5 illustrates a drop-counting detection mechanism.

Turning to FIG. 5, illustrated is a further embodiment of biofluid level detection in accordance with the present invention. Sound pulses emitted by lens 22 are supplied to controller 88. The controller 88 is configured to accumulate and count the pulses received, and to correlate that value to the known average volume of biofluid ejected in each drop. Controller 88 then inferentially calculates the level of biofluid 38 within cartridge 12. This biofluid level information is then used to control the biofluid level.

It is to be appreciated that while alternative embodiments for biofluid level detection in cartridge 12, have been disclosed in connection with FIGS. 3, 4A, 4B and 5, other configurations may also be implemented.

As previously mentioned, by altering the frequency of operation it is possible, using a Fresnel lens design, to alter the amplitude of the emitted acoustic wave. Using this capability the peak of the emitted acoustic wave is controllable. Therefore, as biofluid is emitted, but still within an acceptable range, the amplitude may be adjusted to properly sense the new surface level. By this design additional biofluid does not need to be added until a lower surface level is sensed.

Figure 6:
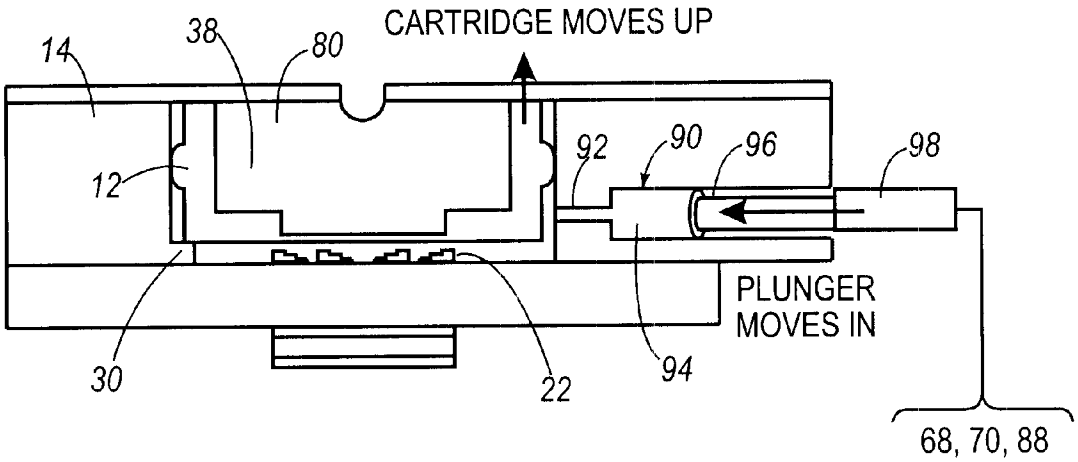
FIG. 6 sets forth a first embodiment for movement of a reagent cartridge in a two-piece acoustic drop ejection unit.

Turning to FIG. 6, illustrated is a first embodiment for altering the position of the reagent cartridge 12 located within the acoustic drop ejection mechanism 14. The position change is made in response to the detection of biofluid levels by techniques shown, for example, in connection with FIGS. 3, 4A, 4B or 5.

When the level of biofluid is determined to be out of a desired range, an adjustment to the level of the reagent cartridge 12 is undertaken. Particularly, provided is an auxiliary fluid chamber 90 placed in operational communication with chamber 30 via chamber connect 92. When it is determined the biofluid level is out of an acceptable range, additional acoustic connection fluid 94 is supplied to chamber 30 by activation of plunger 96. Plunger 96 may be a high-precision plunger controlled by a computer-driven actuator 98. Computer-driven actuator 98 is provided with signals via any one of the controllers 68, 70 or 88 previously discussed in connection with FIGS. 3, 4A, 4B and 5. Plunger 96 is moved inward forcing supplementing acoustic connection fluid 94 into chamber 30 to raise reagent cartridge 12 to a sufficient amount to ensure that surface 80 is within the acceptable height range.

Figure 7:
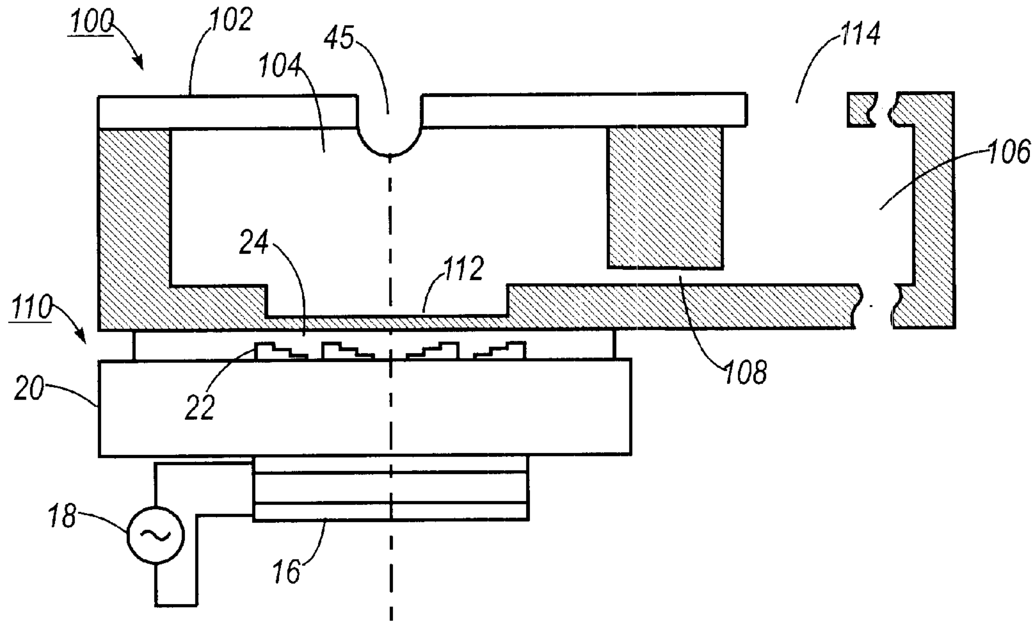
FIG. 7 shows a second embodiment of a supplemental supply for a two-piece acoustic drop ejection mechanism.

FIG. 7 is a side view of a two piece drop ejection unit 100 employing an alternative reagent cartridge 102 configuration. In addition to ejection reservoir 104 which holds biofluid 38, a main reservoir 106 is also provided to feed ejection reservoir 104. A connection path between the ejection reservoir 104 and main reservoir 106 is provided via reservoir connect 108. In this design, as biofluid 38 is ejected from ejection reservoir 104, additional biofluid 38 is supplied via the main reservoir 106 and reservoir connect 108.

Reagent cartridge 102 is in operational arrangement with acoustic drop ejection mechanism 110. Ejection reservoir 104 is located over lens 22, glass substrate 20, and transducer 16 in a manner which allows generated acoustic energy to be focused, and transferred to the ejection reservoir 104 with sufficient energy to emit biofluid drops. In implementing this two piece design connecting layer 24, such as an acoustic coupling fluid is provided, and a bottom portion of cartridge 102 is formed with membrane 112 which allows sufficient acoustic energy to be transferred to ejection reservoir 104.

Main reservoir 106 is filled through filling port 114. The main reservoir 106 and reservoir connect 108 use capillary action to assist in an initial filling oft he ejection reservoir 104 when it is in an empty state. Thereafter, as drops are ejected from ejection reservoir 104 surface tension causes biofluid from the main reservoir to be drawn into the ejection reservoir. Particularly, aperture 45 of ejection reservoir 104 is sufficiently sized smaller than filling port 114 of main reservoir 106 and also small enough to overcome gravitational forces due to reservoir height, that biofluid in main reservoir 106 is drawn into the ejection reservoir 104.

Figure 8:
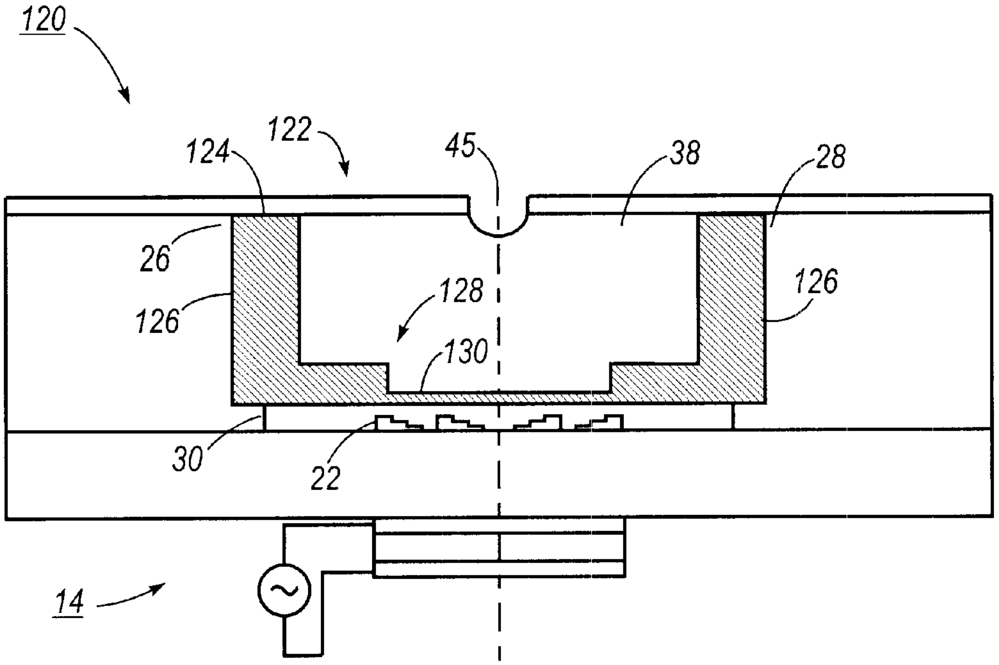
FIG. 8 sets forth a single piece acoustic drop ejection mechanism within which the concepts of the present invention may be implemented.

Turning to FIG. 8, set forth is a single piece biofluid acoustic ejection unit 120. Distinctions between the two-piece biofluid drop ejection unit 10 and the single-piece unit 120, include that seal 32 of reagent cartridge 12 is no longer used. Rather, reagent cartridge 122 has side wall 124 with a planar external surface 126 in direct contact with walls 26,28 of mechanism 14. Therefore, a permanent connection is made between walls 26, 28 and reagent cartridge 122. Such connection may be made during the manufacture of the device via lithographic techniques and/or by use of known adhesion technology.

In a further embodiment, lower surface 128, including membrane 130, may be removed allowing biofluid 38 to come into direct contact with lens 22. Still a further embodiment is to remove cartridge 112 and supply the biofluid directly into chamber 30, where chamber 30 acts as a non-contaminated biofluid containment area. Under this design chamber 30 is filled with biofluid in a contamination-free environment.

Figure 9:
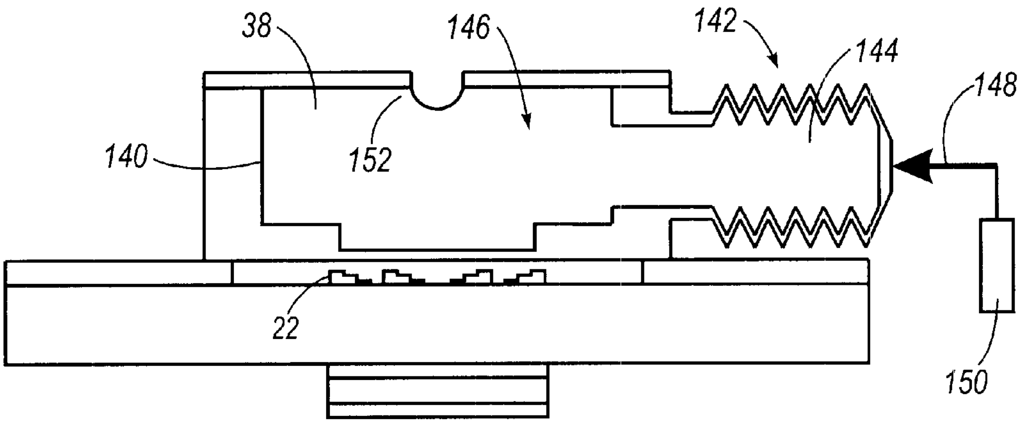
FIG. 9 depicts a first embodiment for supplying additional biofluid in a single-piece system.

FIG. 9 shows an embodiment for supplying additional biofluid to reagent cartridge 140 in order to maintain the biofluid 38 at a desired level. In this embodiment auxiliary fluid holding area 142 has a bellows-shaped configuration with an interior 144 filled with biofluid 38.

Upon receipt of a signal from a level-sensing device (e.g. FIGS. 3, 4A, 4B and 5) indicating biofluid within ejection reservoir 146 is below a desired level, precision plunger 148, controlled by computer operated actuator 150, is moved inward compressing auxiliary biofluid holding chamber 142. This action forces a predetermined amount of biofluid 38 into main chamber 146 such that biofluid meniscus surface 152 is moved to an acceptable, usable level.

Figure 10:
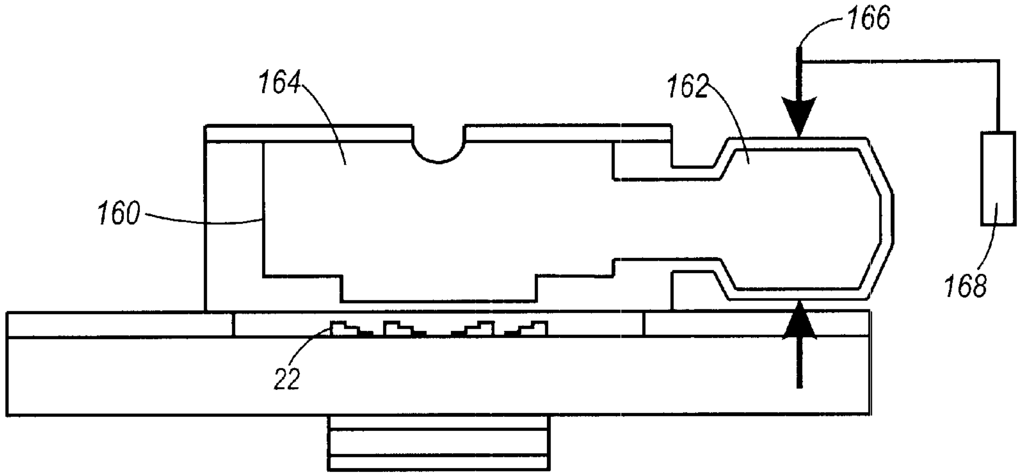
FIG. 10 sets forth a second embodiment for a one-piece acoustic drop ejection mechanism.

FIG. 10 depicts a second embodiment for supplying additional biofluid 38 to reagent chamber 160. In this instance, collapsible auxiliary area or chamber 162 is in fluid communication with ejection reservoir 164. Upon receiving a level signal indicating the level of biofluid 38 is required to be replenished, squeezing mechanism 166 is activated by a computer-controlled actuator 168 to provide inward force on collapsible chamber 162. Pressure is applied in a sufficient amount to resupply ejection reservoir 164 with biofluid, to an acceptable usable level.

Figure 11:
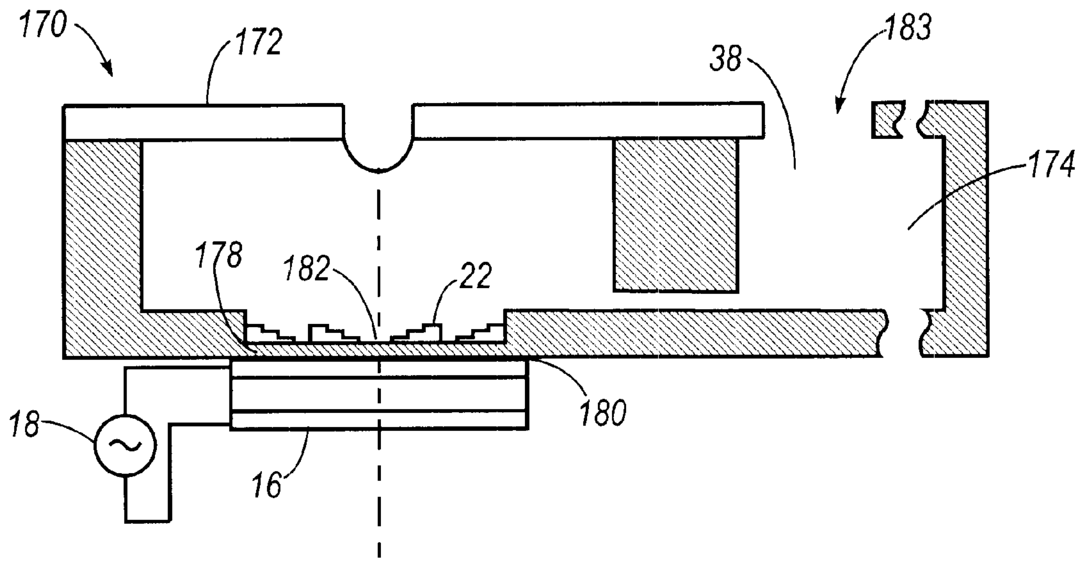
FIG. 11 depicts a second embodiment for a single-piece acoustic drop ejection mechanism.

Turning to FIG. 11, illustrated is an alternative embodiment for a single piece acoustic drop ejection unit 170. In this figure, ejection reservoir 172 and main reservoir 174 are placed in fluid communication by reservoir connect 176. Biofluid 38 is supplied from main reservoir 174 to ejection reservoir 172 due to surface tension at the meniscus, as discussed in connection with FIG. 7. Transducer 16 is in operational connection to substrate 178 on a first surface 180, and lens 22 is on a second surface 182 whereby these components are formed as part of the single unit 170. In this embodiment, connecting layer 24 of FIG. 7 is not required due to the single component disposable nature of the present embodiment. In ejection reservoir 172, biofluid comes into direct contact with lens 22. Therefore, there is no need for the acoustic coupling fluid provided in FIG. 7. Main reservoir 174 is filled through filling port 183.

Figure 12:
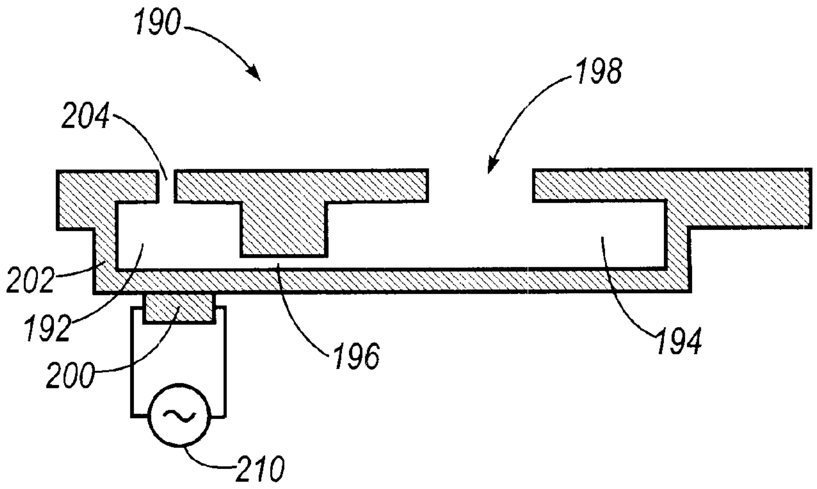
FIG. 12 illustrates a single piece piezo-electric drop ejection mechanism having a secondary biofluid holding region.

FIG. 12 is a side view of a single piece piezoelectric drop ejection unit 190. Ejection reservoir 192 is connected to main reservoir 194 via reservoir connect 196. Biofluid is supplied to main reservoir 194 via filling port 198. A piezo actuator 200 is in operational attachment to a lower surface 202 of ejection reservoir 192. An upper surface defining the ejection reservoir 192 has formed therein an ejection nozzle 204.

In operation piezo actuator 200 is actuated by power supply 210, which in combination with lower surface 202, define a unimorph, and deflects in response to an applied voltage. In this instance a force is imposed such that the unimorph configuration moves into ejection reservoir 192, thereby altering the volume of ejection reservoir 192, which in turn forces biofluid from the ejection reservoir 202 through nozzle 204 as an ejected biodrop. The size of nozzle 204 is a controlling factor as to the size of. the ejected drops.

As biofluid drops are emitted from ejection reservoir 192, surface tension in the ejection reservoir causes biofluid located in main reservoir 194 to be drawn through reservoir connect 196 into ejection reservoir 192, thereby replenishing the biofluid level. In the present embodiment, main reservoir 194 has an internal dimension of 1 cm in length and 2.5 mm in height. The width of the overall piezoelectric drop ejection unit is 5 mm. In one embodiment the volume of biofluid in a full main reservoir may be from 50 to 150 microliters and the biofluid in the ejection reservoir may be between 5 and 25 microliters. The ratio of biofluid in the reservoirs may range from 2 to 1 up to 10 to 1. In other situations the ratio may be greater. The volume of biofluid drops may be in the picoliter range.

As can be seen in FIG. 12, lower surface 202 connected to piezo actuator 200 is integrated into the overall piezoelectric drop ejector unit 190. Under this construction, when biofluid of unit 190 is depleted, the entire unit 190 may be disposed.

Figure 13:
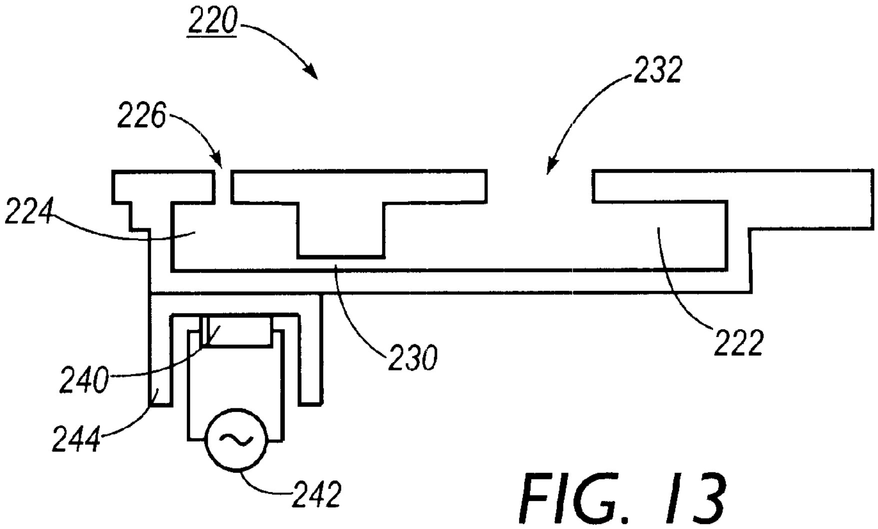
FIG. 13 depicts a two-piece piezo-electric drop ejection mechanism having a secondary biofluid holding region.

Turning to FIG. 13, illustrated is a side view of a two piece piezoelectric biofluid drop ejection unit 220 having a disposable portion and a reusable portion. The disposable portion includes a main reservoir 222 and an ejection reservoir 224 which has integrated therein an ejection nozzle 226. The ejection reservoir 224, being connected to main reservoir 222 via reservoir connect 230. Transmission of biofluid from main reservoir 222 to ejection reservoir 224, via reservoir connect 230 occurs due to surface tension existing in ejection reservoir 224. Also included is a filling port 232.

The reusable portion of unit 220 includes piezo actuator 240 powered by a power supply source 242. The piezo actuator 240 is carried on a reusable frame 244.

A lower surface of ejection reservoir 224 is formed as a membrane 246 and is connected to an upper surface or diaphragm 248 of reusable frame 244. Diaphragm 248 is bonded or otherwise connected to piezo actuator 240 such that diaphragm 248 acts as part of a unimorph structure to create a necessary volume change within ejection reservoir 224 in order to eject a biofluid drop from ejection nozzle 226. Membrane 246 of cartridge 222 acts to transfer the volume change in the reusable portion 244 into the disposable portion.

In a further embodiment, the reusable portion has a flexible membrane with a piezo actuator on one surface to generate the volume displacement necessary to expel a biofluid drop. A container may be fabricated to place a connecting liquid in contact with the transducer/membrane. This liquid assists in transmitting the transducer-induced volume changes to a second membrane on a different container surface. The container edges are constructed to make a hermetic seal between the reusable and the disposable parts. The container has a provision for removing (bleeding) air bubbles from the connecting liquid. The opposite surface is open before assembling with the disposable part.

A hermetic seal is provided between the disposable and reusable portions, and the reusable portion is filled with a connecting liquid to transmit the volume changes from the transducer to the disposable portion. To minimize compliance and absorption of volume changes, all air bubbles in this fluid are removed before operation by bleeding them through a bleeding mechanism in the reusable portion.

One skilled in the art would understand that other piezo actuator configurations, such as bulk or shear mode designs, may also be used in conjunction with the present invention.

In the foregoing discussion, configurations are disclosed which function to ensure that the necessary biofluid levels are maintained in a system. In an alternative embodiment, the concepts discussed in connection with FIGS. 4A and 4B may be used in systems where additional biofluid is not added.

In one embodiment an adjustment of the generated acoustic wave is used to extend the operational capabilities of the system. This embodiment is applicable to both a Fresnel lens and a spherical lens.

With attention to FIGS. 4A and 4B, rather than using controller 70 to selectively activate an actuator, controller 70 supplies signal generator 12 with an indication to increase or decrease amplitude output when it is determined that the fluid height is not at the desired level. By this action, the focal point of the acoustic wave is adjusted to occur at the actual meniscus height.

A further embodiment would be to again use the concepts of FIGS. 4A and 4B to detect that the fluid height is not at a desired level. Thereafter, when using a Fresnel lens, it is possible to change operational frequency in order to tune the focal point to the exact fluid height existing at a particular time within the device. For a Fresnel lens the focal position is substantially a linear function of frequency. Therefore, in FIGS. 4A and 4B, the initial step is measurement of the actual biofluid level. Then, controller 70 tunes the frequency of operation such that the focal point is moved to where the meniscus surface actually exists.

Using the foregoing design, it is possible to present a system which forgoes the use of an actuator. Rather, use of frequency control and/or amplitude control expands the range of the appropriate biofluid level for operation of the device. For example, without amplitude or frequency control described above, the range for appropriate use would be +/−5 microns from an ideal level. However, by implementing amplitude control this can be expanded to potentially +/−10 microns, and through frequency control to +/−30 microns.

The frequency and acoustic control concepts may be used alone, without the use of an actuator, or in connection with actuator concepts to provide a more refined control.

In piezoelectric drop ejection units, initial operation may not produce desired drop output. Particularly, when air bubbles exist within the ejection reservoir, non-spherical drops, or drops which are not of a proper consistency or size may be ejected, and more likely no drops will be produced. Therefore, a priming of the ejection unit is desirable.

Figure 14:
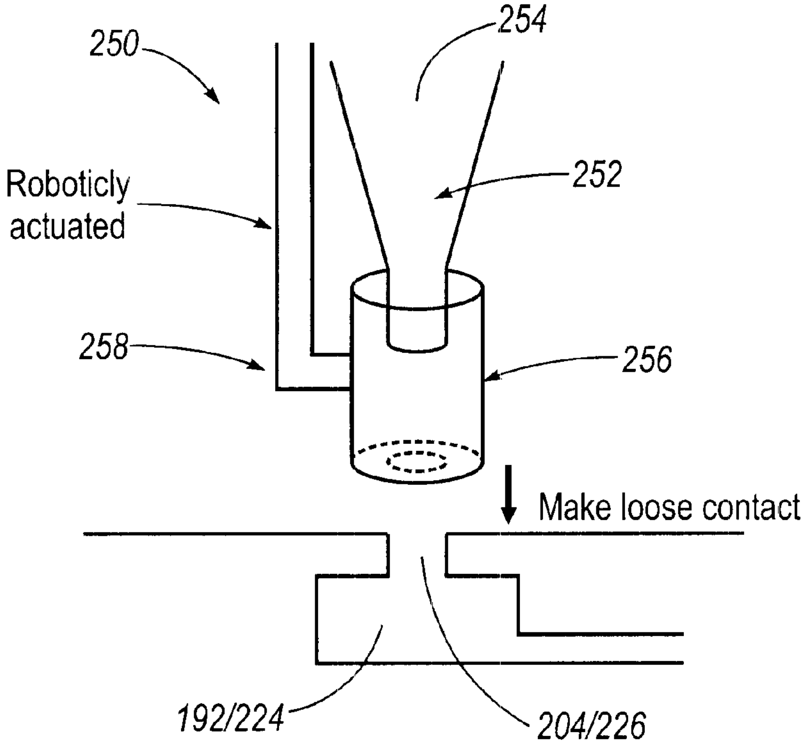
FIG. 14 sets forth a priming configuration for a piezo-electric drop ejection mechanism.

FIG. 14 illustrates a primer connection or mechanism 250 which may be used in accordance with the present invention. As shown in FIG. 14, the primer connection 250 is located over a nozzle (204, 226) which is configured to emit biofluid from an ejection reservoir (192, 224). In operation, disposable primer connection 250 may be a robotically actuated device, which moves over an ejection nozzle (204,226). The primer connection 250 includes a permanent vacuum nozzle 252 connected to a vacuum unit 254. Placed around permanent vacuum nozzle 252 is a disposable tubing 256 made of an elastomaric or other suitable material. Once located over ejection nozzle (204, 224), the vacuum nozzle 252 is moved downward, placing the disposable tubing 256 into a loose contact with nozzle (204, 226). Vacuuming action vacuums air out of the ejection reservoir (204,226).

A robotically controlled liquid height detection sensor 258 determines when the biofluid has reached a level out of the nozzle, such that it is ensured air within the ejection reservoir has been removed. This priming operation permits for proper initial drop ejection operation.

Figure 15:
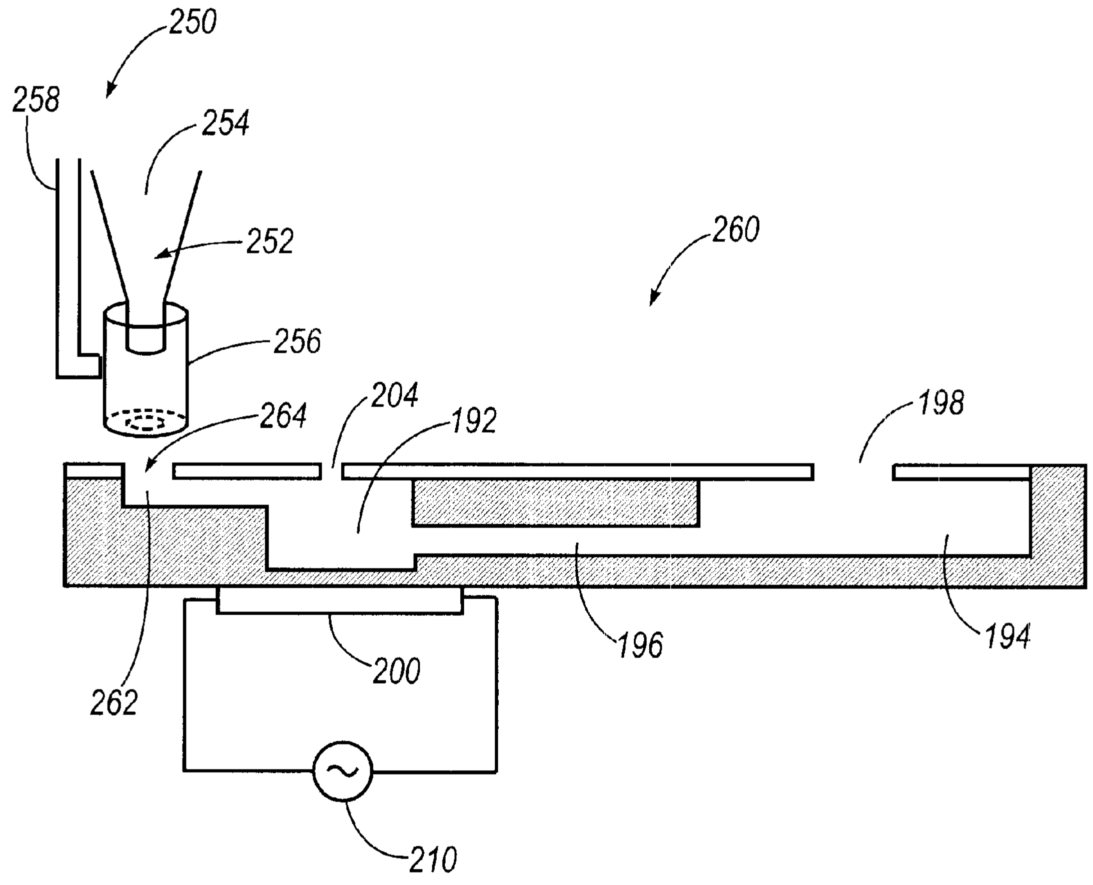
FIG. 15 illustrates a modified single piece piezoelectric drop ejection mechanism incorporating a priming reservoir.

Turning to FIG. 15, illustrated is a modified single piece piezoelectric drop ejection unit 260 designed in a manner similar to the ejection unit 190 illustrated in FIG. 12. Therefore common elements are numbered similarly. However, the presently configured unit 260 also includes a priming reservoir 262 having a priming opening 264. Priming is accomplished by movement of priming system 250 to a position over priming opening 264. Once sleeve 256 is engaged with opening 264, a vacuum pressure is applied to draw the biofluid for priming purposes. During this operation, power supply 210 generates pulses for activation of piezo actuator 200 in order to move biofluid within ejection reservoir 192 up to nozzle 204.

It is to be understood that the reagent cartridges discussed in the foregoing embodiments are simply representative designs of such a device, and that there are many possible variations to the cartridge configuration.

While the forgoing description sets forth embodiments for acoustic drop ejection units and piezoelectric drop ejection units, the concepts of the present invention may be extended to other drop ejection mechanisms and for fluid other than biofluids for which avoidance of contamination is beneficial.

It is to be further understood that while the figures in the above description illustrate the present invention, they are exemplary only. Others will recognize numerous modifications and adaptations of the illustrated embodiments which are in accord with the principles of the present invention. Therefore, the scope of the present invention is to be defined by the appended claims.

Having thus described the preferred embodiments, what is claimed is:

1. A biofluid drop ejection device which ejects biofluid drops, comprising:

a biofluid drop ejection mechanism having a transducer which generates energy and a focusing lens used to emit the biofluid drops;

a reagent cartridge holding a biofluid, isolated and removable from the drop ejection mechanism to avoid contamination between the biofluid drop ejection mechanism and the reagent cartridge, the reagent cartridge in operative connection with the drop ejection mechanism such that upon operation of the drop ejection mechanism, the biofluid is emitted as the biofluid drops; and a level sensor positioned to sense a height of the biofluid within the cartridge, wherein upon sensing the height of the biofluid below a defined level, an adjustment is made to at least one of the biofluid, the reagent cartridge, and the transducer.

2. The invention according to claim 1 further including a biofluid adjustment mechanism, configured to alter the level of at least one of the biofluid within the reagent cartridge and the level of the reagent cartridge in relationship to the biofluid drop ejection mechanism, when the level sensor senses the height of the biofluid below the predetermined level.

3. The invention according to claim 1 wherein the level sensor includes:

at least one acoustic pulse generator/detector capable of emitting an acoustic pulse, the acoustic pulse generator/detector positioned in relationship to the biofluid such that the acoustic pulse emitted from the acoustic pulse generator/detector travels through the biofluid to a surface of the biofluid, where the acoustic pulse is then reflected back through the biofluid and further configured to sense emission of the acoustic pulse and to sense arrival of the reflected acoustic pulse;

a timer to determine the time from acoustic pulse emission to acoustic pulse arrival; and a biofluid height calculator, configured to receive the determined time and to calculate the height of the biofluid.

4. The invention according to claim 1 wherein the level sensor includes:

at least one laser capable of emitting a laser beam, the laser positioned in relationship to the biofluid such that the laser beam emitted from the laser is reflected from the surface of the biofluid;

an optical sensor configuration positioned to sense the laser beam reflected from the biofluid surface; and a biofluid height calculator configured to receive data from at least the optical sensor, wherein the received data represents the biofluid height level.

5. The invention according to claim 1 wherein the level sensor includes:

a drop detector designed to detect a number of drops emitted from the reagent cartridge; and a biofluid height calculator configured to determine the height of the biofluid based on the number of drops emitted.

6. The invention according to claim 2 wherein the adjustment mechanism includes:

a chamber having an amount of biofluid contained therein, the chamber in fluid communication with an interior of the reagent cartridge; and an actuator in operational connection with the chamber, to selectively regulate movement of biofluid between the reagent cartridge and the chamber.

7. The invention according to claim 2 wherein the adjustment mechanism includes:

a reagent cartridge holding chamber within which is located the reagent cartridge;

a reagent cartridge control fluid reservoir in fluid communication with outer surfaces of the reagent cartridge holding chamber; and an actuator in operational connection with the fluid reservoir, to selectively regulate movement of reagent cartridge control fluid between the reagent cartridge holding chamber and the reagent cartridge control fluid reservoir.

8. The invention according to claim 1 wherein the biofluid ejection mechanism and the reagent cartridge are configured as a single unit.

9. The invention according to claim 1 wherein the biofluid ejection mechanism and reagent cartridge are separate components, with the biofluid ejection mechanism configured to be reusable with a plurality of reagent cartridges holding biofluid distinct from each other.

10. The invention according to claim 1 wherein the biofluid drop ejection mechanism is an acoustic drop ejection mechanism.

11. The invention according to claim 1 wherein the biofluid drop ejection mechanism is a piezoelectric drop ejection mechanism.

12. The invention according to claim 1, wherein the drop ejection mechanism further includes a substrate.

13. The invention according to claim 1 further including an adjustment mechanism, configured to alter the level of the reagent cartridge in relationship to the biofluid drop ejection mechanism, wherein adjustment occurs when the level sensor senses the height of the biofluid below the predetermined level.

14. The invention according to claim 4, wherein the level sensor is separate from the reagent cartridge.

15. A biofluid drop ejection system which ejects biofluid drops, comprising:

a biofluid drop ejection mechanism having a transducer which generates energy and a focusing lens used to emit the biofluid drops; and a reagent cartridge holding a biofluid, isolated and removable from the drop ejection mechanism to avoid contamination between the biofluid drop ejection mechanism and the reagent cartridge, the reagent cartridge connected to the drop ejection mechanism such that upon operation of the drop ejection mechanism the biofluid is emitted as the biofluid drops.

16. The invention according to claim 15 wherein the reagent cartridge includes:

an ejection reservoir holding biofluid to be ejected;

a main reservoir holding biofluid to be supplied to the ejection reservoir; and a reservoir connect which places the ejection reservoir and main reservoir in fluid communication.

17. The invention according to claim 16 wherein the main reservoir supplies biofluid to the ejection reservoir by capillary action.

18. The invention according to claim 15 wherein the biofluid ejection mechanism and the reagent cartridge are configured as a single unit.

19. The invention according to claim 15 wherein the biofluid ejection mechanism and reagent cartridge are separate components, with the biofluid ejection mechanism configured to be reusable with a plurality of reagent cartridges holding biofluid distinct from each other.

20. The invention according to claim 15 wherein the biofluid drop ejection mechanism is an acoustic drop ejection mechanism.

21. The invention according to claim 15 wherein the biofluid drop ejection mechanism is a piezoelectric drop ejection mechanism.

22. A biofluid drop ejection device which ejects biofluid drops, comprising:

a biofluid drop ejection mechanism having a transducer which generates energy and a focusing lens used to emit the biofluid drops;

a removable biofluid containment area holding the biofluid in a contamination-free state, the biofluid containment area configured within the drop ejection mechanism such that upon operation of the drop ejection mechanism, the biofluid is emitted as the biofluid drops;

a controller configured to sense a height of the biofluid within the biofluid containment area; and a power source connected to the transducer, and to the controller, wherein the controller adjusts at least one of an output power from the power source and a frequency of the power source, to alter a generated acoustic wave to a level substantially equal to the sensed height of the biofluid.

* * * * *